(12) United States Patent
Shenoy et al.

(10) Patent No.: US 12,284,169 B2
(45) Date of Patent: Apr. 22, 2025

(54) ACCESSING CORPORATE RESOURCES THROUGH AN ENROLLED USER DEVICE

(71) Applicant: Omnissa, LLC, Mountain View, CA (US)

(72) Inventors: Pranav Ashok Shenoy, Bangalore (IN); Sharun Varghese Samuel, Bangalore (IN); Rohit Pradeep Shetty, Bangalore (IN)

(73) Assignee: Omnissa, LLC, Mountain View, CA (US)

(*) Notice: Subject to any disclaimer, the term of this patent is extended or adjusted under 35 U.S.C. 154(b) by 368 days.

(21) Appl. No.: 17/458,637

(22) Filed: Aug. 27, 2021

(65) Prior Publication Data
US 2023/0018433 A1  Jan. 19, 2023

(30) Foreign Application Priority Data

Jul. 13, 2021 (IN) .............................. 202141031422

(51) Int. Cl.
*H04L 9/40* (2022.01)
(52) U.S. Cl.
CPC ........ *H04L 63/0823* (2013.01); *H04L 63/102* (2013.01)
(58) Field of Classification Search
CPC .. H04L 63/0823; H04L 63/102; H04W 12/55; H04W 12/71; H04W 12/069
See application file for complete search history.

(56) References Cited

U.S. PATENT DOCUMENTS

| 8,613,070 B1* | 12/2013 | Borzycki | .............. H04L 67/104 |
| | | | 726/8 |
| 9,094,407 B1* | 7/2015 | Matthieu | .................. H04L 63/10 |
| 9,444,805 B1* | 9/2016 | Saylor | .................... H04L 63/08 |
| 9,942,200 B1* | 4/2018 | Tan | ..................... H04L 63/0281 |
| 10,673,971 B1 | 6/2020 | Hindanov | |
| 10,791,140 B1* | 9/2020 | Dahlberg | .............. H04L 51/234 |

(Continued)

FOREIGN PATENT DOCUMENTS

| AU | 2009249046 A1 * | 1/2011 | ............. G06Q 30/02 |
| CA | 3060406 A1 * | 10/2018 | ........... H04L 1/0026 |

(Continued)

OTHER PUBLICATIONS

Notice of Allowance mailed Sep. 20, 2024 in U.S. Appl. No. 17/458,611, 11 pages.

(Continued)

*Primary Examiner* — Shahriar Zarrineh
(74) *Attorney, Agent, or Firm* — Kim & Stewart LLP

(57) ABSTRACT

Systems and methods are described for accessing resources of a Unified Endpoint Management ("UEM") system through an enrolled device. In an example, an unenrolled device can be paired with an enrolled device. The unenrolled device can connect to the enrolled device on a local network. The enrolled device can verify the unenrolled device using a key provided during pairing. The unenrolled device can send requests for UEM resources to the enrolled device, which the enrolled device can send to a UEM server. The UEM server can send the requested UEM resources to the enrolled device, and the enrolled device can send the UEM resources to the enrolled device over the local network.

20 Claims, 7 Drawing Sheets

(56) References Cited

U.S. PATENT DOCUMENTS

| | | | | |
|---|---|---|---|---|
| 2002/0087857 | A1* | 7/2002 | Tsao | G07F 7/1008 |
| | | | | 705/55 |
| 2003/0187991 | A1* | 10/2003 | Lin | H04L 67/02 |
| | | | | 709/227 |
| 2005/0149723 | A1* | 7/2005 | Watkins | H04L 63/0823 |
| | | | | 713/156 |
| 2006/0069687 | A1* | 3/2006 | Cui | H04L 67/02 |
| 2010/0014418 | A1* | 1/2010 | Yonezawa | G06F 11/2028 |
| | | | | 370/225 |
| 2010/0058064 | A1 | 3/2010 | Kirovski | |
| 2010/0332836 | A1* | 12/2010 | Shen | H04L 63/0435 |
| | | | | 709/227 |
| 2011/0167351 | A1* | 7/2011 | Arora | H04M 1/72415 |
| | | | | 715/740 |
| 2013/0067231 | A1* | 3/2013 | Mudigonda | H04L 67/1001 |
| | | | | 709/219 |
| 2013/0250956 | A1* | 9/2013 | Sun | H04L 12/4633 |
| | | | | 370/392 |
| 2014/0331297 | A1* | 11/2014 | Innes | H04L 63/0823 |
| | | | | 726/7 |
| 2015/0205510 | A1 | 7/2015 | Hirakata | |
| 2016/0269403 | A1 | 9/2016 | Koutenaei et al. | |
| 2017/0063846 | A1* | 3/2017 | Mohamad Abdul | |
| | | | | H04L 67/306 |
| 2017/0099280 | A1* | 4/2017 | Goel | H04L 67/146 |
| 2017/0118210 | A1 | 4/2017 | Athias | |
| 2017/0126812 | A1* | 5/2017 | Singhal | H04L 67/142 |
| 2017/0195826 | A1* | 7/2017 | Shaikh | H04L 63/105 |
| 2017/0272316 | A1* | 9/2017 | Johnson | H04L 61/301 |
| 2017/0322855 | A1* | 11/2017 | Hammam | G06F 11/2005 |
| 2018/0006829 | A1* | 1/2018 | Kravitz | H04W 12/06 |
| 2018/0034913 | A1* | 2/2018 | Matthieu | H04L 67/52 |
| 2018/0097639 | A1* | 4/2018 | Gulati | G06F 8/61 |
| 2018/0139090 | A1* | 5/2018 | Geiger | H04L 67/12 |
| 2019/0021128 | A1* | 1/2019 | Sivavakeesar | H04W 76/19 |
| 2019/0158353 | A1* | 5/2019 | Johnson | H04L 41/0803 |
| 2019/0239073 | A1* | 8/2019 | Mistry | H04L 67/141 |
| 2019/0243956 | A1 | 8/2019 | Sheets | |
| 2019/0356694 | A1* | 11/2019 | Wang | H04L 63/0823 |
| 2020/0059881 | A1* | 2/2020 | Gupta | H04W 12/009 |
| 2020/0162557 | A1* | 5/2020 | Gattu | H04L 41/0893 |
| 2020/0213360 | A1* | 7/2020 | Ojha | H04W 88/04 |
| 2021/0397436 | A1* | 12/2021 | Le | G06F 8/61 |
| 2022/0022035 | A1 | 1/2022 | Sampson | |
| 2022/0038448 | A1 | 2/2022 | DeFilippo | |
| 2022/0038910 | A1* | 2/2022 | Hwang | H04W 12/66 |
| 2022/0060450 | A1* | 2/2022 | Slovetskiy | H04L 67/142 |
| 2022/0150069 | A1 | 5/2022 | Shirashvad | |
| 2022/0377060 | A1* | 11/2022 | Livny | H04L 63/068 |

FOREIGN PATENT DOCUMENTS

| | | | | | |
|---|---|---|---|---|---|
| CA | 3056351 | A1 | * | 5/2020 | H04L 41/044 |
| CN | 101529808 | A | * | 9/2009 | H04L 41/0677 |
| CN | 101874418 | A | * | 10/2010 | H04L 12/1485 |
| CN | 102143137 | A | * | 8/2011 | H04L 1/18 |
| CN | 101297312 | B | * | 5/2012 | H04L 51/04 |
| CN | 103975626 | A | * | 8/2014 | H04W 36/0066 |
| CN | 104834617 | A | * | 8/2015 | |
| CN | 106716975 | A | * | 5/2017 | H04L 67/06 |
| CN | 107211004 | A | * | 9/2017 | G06F 21/88 |
| CN | 110049723 | A | * | 7/2019 | A61B 5/0004 |
| CN | 114499907 | A | * | 5/2022 | |
| CN | 119068879 | A | * | 12/2024 | |
| EP | 2993854 | A1 | * | 3/2016 | H04L 41/0668 |
| EP | 4027746 | A1 | * | 7/2022 | H04L 1/0025 |
| JP | 2011507369 | A | * | 3/2011 | |
| JP | 2013537387 | A | * | 9/2013 | |
| JP | 6940584 | B2 | * | 9/2021 | G06F 21/33 |
| WO | 2009/143274 | A1 | | 11/2009 | |
| WO | WO-2009152861 | A1 | * | 12/2009 | H04W 24/04 |
| WO | WO-2014047168 | A1 | * | 3/2014 | G06F 21/12 |
| WO | WO-2017032197 | A1 | * | 3/2017 | H04W 24/02 |
| WO | WO-2019040651 | A1 | * | 2/2019 | H04L 63/0823 |
| WO | WO-2019096274 | A1 | * | 5/2019 | H04L 43/06 |
| WO | WO-2023273793 | A1 | * | 1/2023 | |
| WO | WO-2024031699 | A1 | * | 2/2024 | |

OTHER PUBLICATIONS

Non-Final Office Action mailed May 20, 2024 in U.S. Appl. No. 17/458,611, 24 pages.

Final Office Action mailed Nov. 29, 2023 in U.S. Appl. No. 17/458,611, 24 pages.

\* cited by examiner

ACCESSING CORPORATE RESOURCES THROUGH AN ENROLLED USER DEVICE

RELATED APPLICATIONS

Benefit is claimed under 35 U.S.C. 119(a)-(d) to Foreign Application Serial No. 202141031422 filed in India entitled "ACCESSING CORPORATE RESOURCES THROUGH AN ENROLLED USER DEVICE", on Jul. 13, 2021, by VMware, Inc., which is herein incorporated in its entirety by reference for all purposes The present application Ser. No. 17/458,637 is related in subject matter to U.S. patent application Ser. No. 17/458,611, which is incorporated herein by reference

BACKGROUND

Enterprises sometimes use device managements systems, such as a Unified Endpoint Management ("UEM") system, to secure and control certain aspects of user devices of employees. This often includes installing management software on the employee's user device that enforces security and compliance settings. Users often have multiple user devices, including personal computers, cell phones, and tablets. UEM systems typically require that the management software be installed on a user device to be provided access to UEM resources. This requires the employee to enroll each device before being able to use them.

However, registering every device can be cumbersome and time consuming for employees. Additionally, employees sometimes do not want to enroll personal devices for privacy and other concerns. The employee is then required to choose between sacrificing privacy and not being able to use a personal device for work purposes.

As a result, a need exists for allowing unenrolled devices to access UEM resources.

SUMMARY

Examples described herein include systems and methods for accessing system resources through an enrolled user device. In an example, a user can have two user devices. One of the user devices can be enrolled in a UEM system while the other is not. The unenrolled device can include a UEM browser that is managed by the UEM system. The user can pair the two user devices.

During pairing, the two user devices can connect to each other. As an example, the two devices can be connected to the same local network, and the unenrolled device can be given the local ("internet protocol") IP address of the enrolled device. The unenrolled device can then connect to the enrolled device using the local IP address. The enrolled device can generate a random number and share it with the unenrolled device. The two devices can then display the random number, and the user can confirm that both devices are displaying the same number. In one example, the two devices can exchange public keys that are part of an encryption key pair where the two devices securely store their corresponding private keys. The unenrolled device can also generate a random key and send it to the enrolled device. The random key can be used to verify communications from the unenrolled device.

After the two devices are paired, which can be immediately afterward or at a later time, the unenrolled device can send a broadcast on a local network that it is connected to, and the broadcast can include the random key. The enrolled device, connected to the same network, can detect the broadcast and identify it as coming from the unenrolled device based on the random key. The two devices can connect to each other, and the unenrolled device can send a request for UEM resources to the enrolled device. The enrolled device can send the request to a server in the UEM system. The UEM system can provide the requested resource to the enrolled device, and the enrolled device can send the UEM resource to the unenrolled device. In an example, the enrolled device can continue to facilitate data requests and transfers between the unenrolled device and the UEM server.

In an example, an enrolled device can also facilitate data transfers between an Internet of Things ("IoT") device and the UEM server. For example, an enrolled device can register the IoT device with the UEM server. Registering can include obtaining a unique identifier ("ID") of the IoT device and sending it to the UEM server. It can also include providing a certificate or security key to the IoT device that the IoT device can use to authenticate itself.

In an example, the IoT device can be in a location where it cannot access the UEM server through a network. After the IoT device is registered, the IoT device can scan for enrolled devices in the area. For example, the IoT device can broadcast a signal that enrolled device can be configured to listen for, or vice versa. Upon detecting an enrolled device, the IoT device can send its unique ID and any security certificate to the enrolled device. The enrolled device can send the unique ID and certificate to the UEM server. The UEM server, upon verifying the unique ID and certificate, can open a data transfer session with the IoT device through the enrolled device.

In an example, if the session gets disconnected for the data exchange is complete, the UEM server can save the session, including identifying the information that was successfully exchanged. When the IoT device is able to connect to another enrolled device, the UEM server can reopen the session, and the data exchange can continue from where it was disconnected.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for accessing resources of a UEM system through an enrolled device. In an example, an unenrolled device can be paired with an enrolled device. The unenrolled device can connect to the enrolled device on a local network. The enrolled device can verify the unenrolled device using a key provided during pairing. The unenrolled device can send requests for UEM resources to the enrolled device, which the enrolled device can send to a UEM server. The UEM server can send the requested UEM resources to the enrolled device, and the enrolled device can send the UEM resources to the enrolled device over the local network.

In another example, an IoT device can be registered with the UEM system. The IoT device can be unable to connect to the UEM server. The IoT device can scan for enrolled devices. Upon detecting an enrolled device, the IoT device can provide an ID that identifies the IoT device to the enrolled device. The enrolled device can connect to the UEM server, and the UEM server can open a data transfer session for the IoT device. The IoT device and the UEM server can exchange information through the enrolled device.

Figure 1:
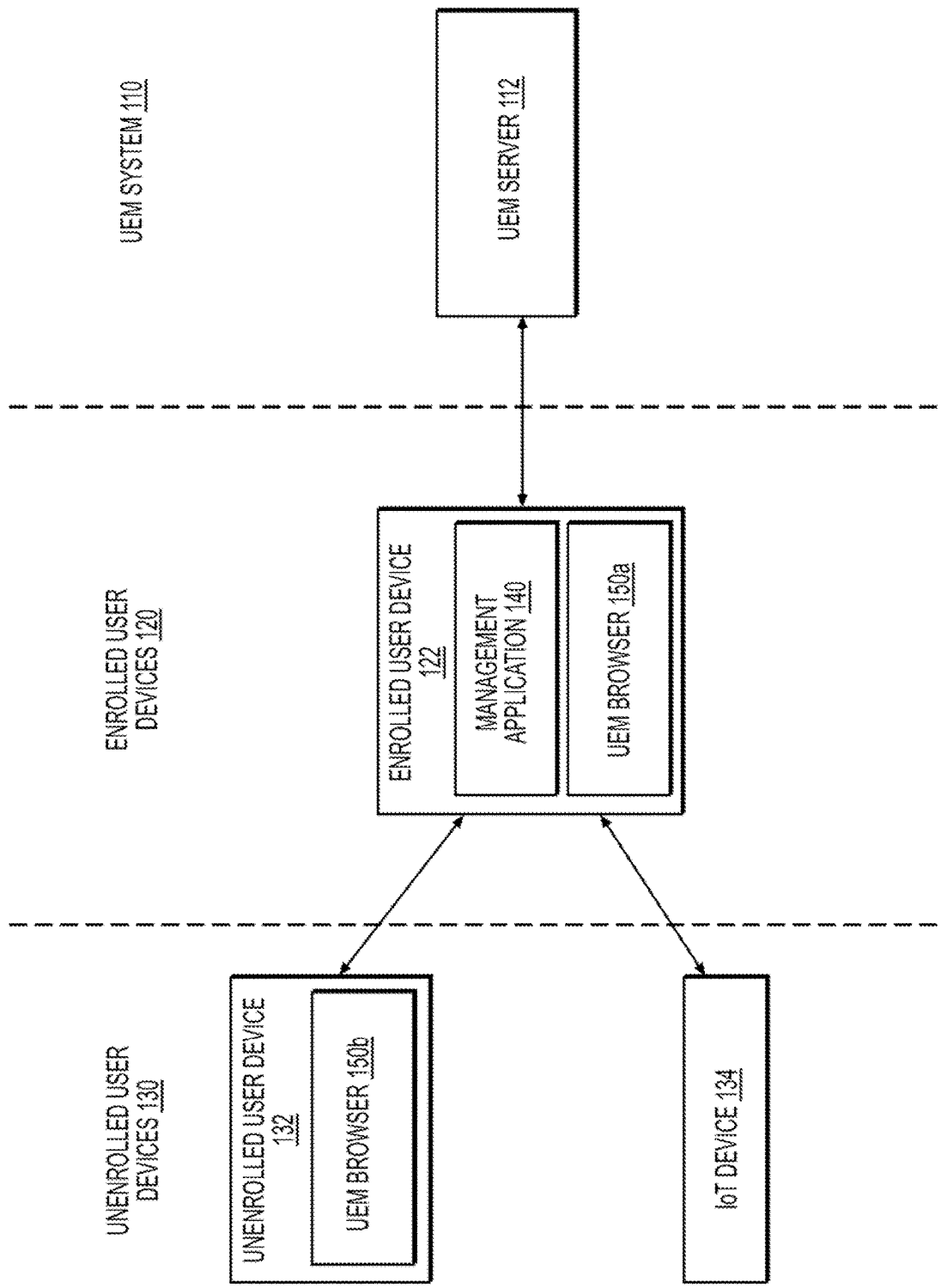
FIG. 1 is an illustration of an example system for accessing system resources through an enrolled user device.
Figure 2:
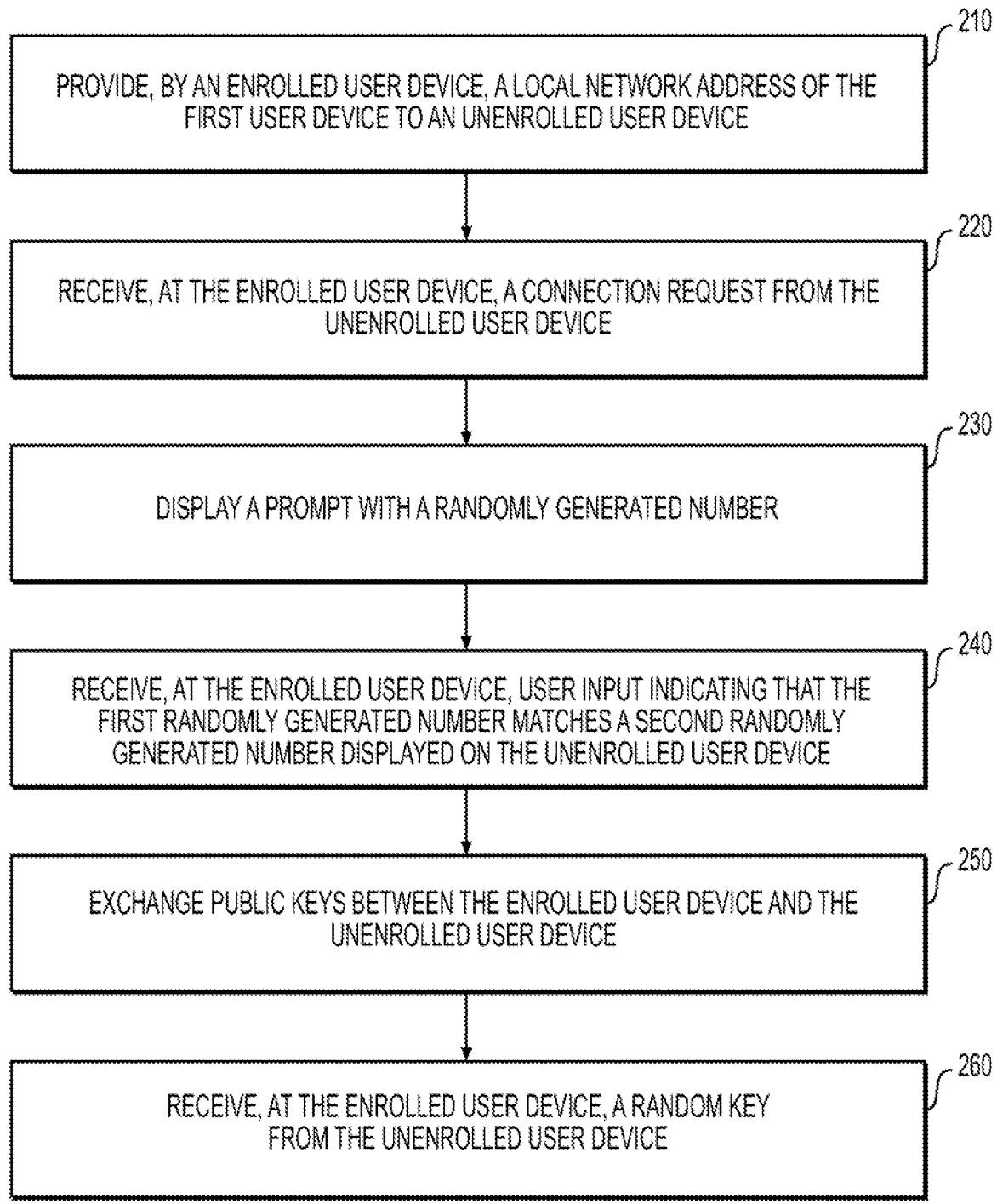
FIG. 2 is a flowchart of an example method for accessing system resources through an enrolled user device.
Figure 3:
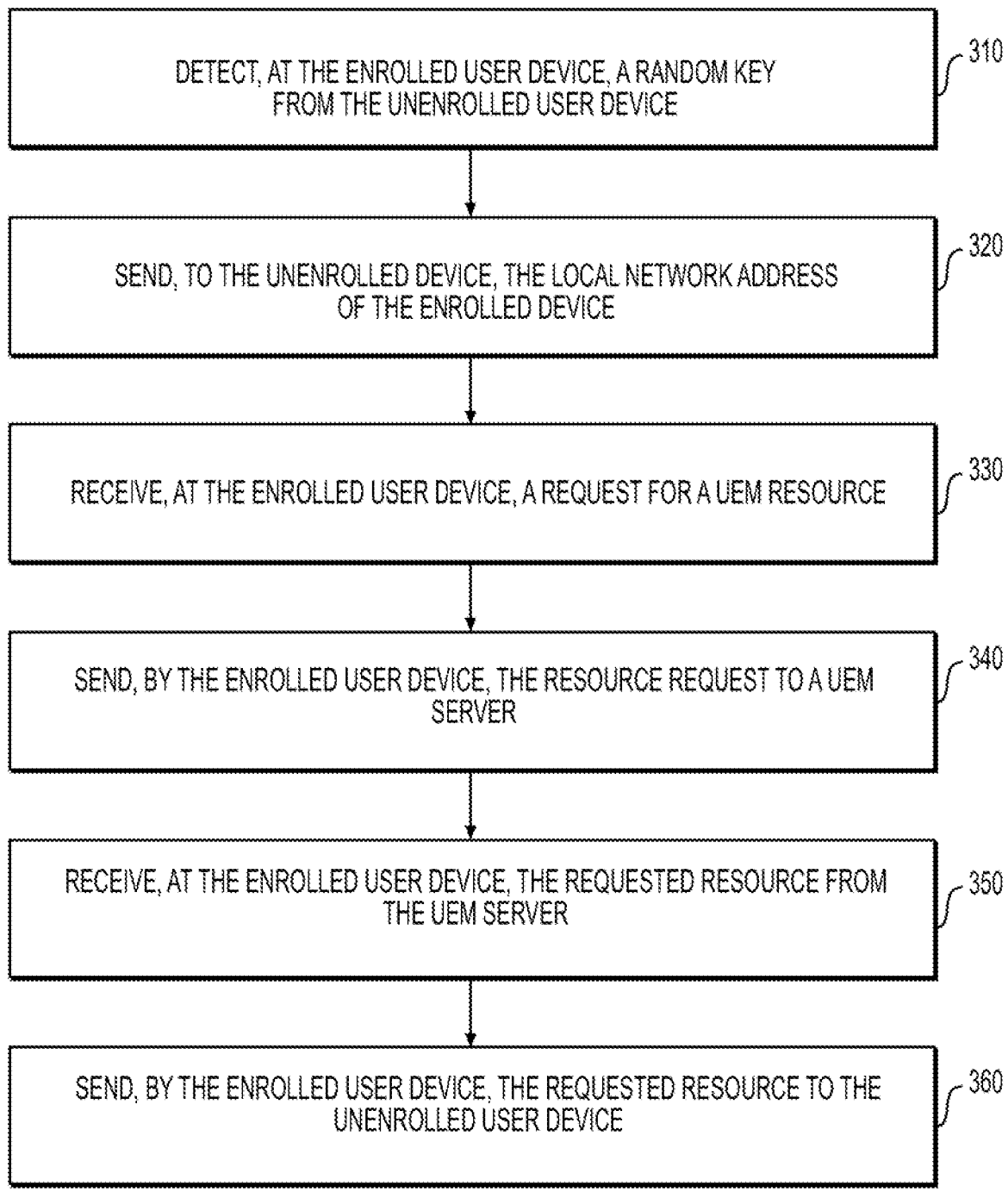
FIG. 3 is another flowchart of an example method for accessing system resources through an enrolled user device.
Figure 4:
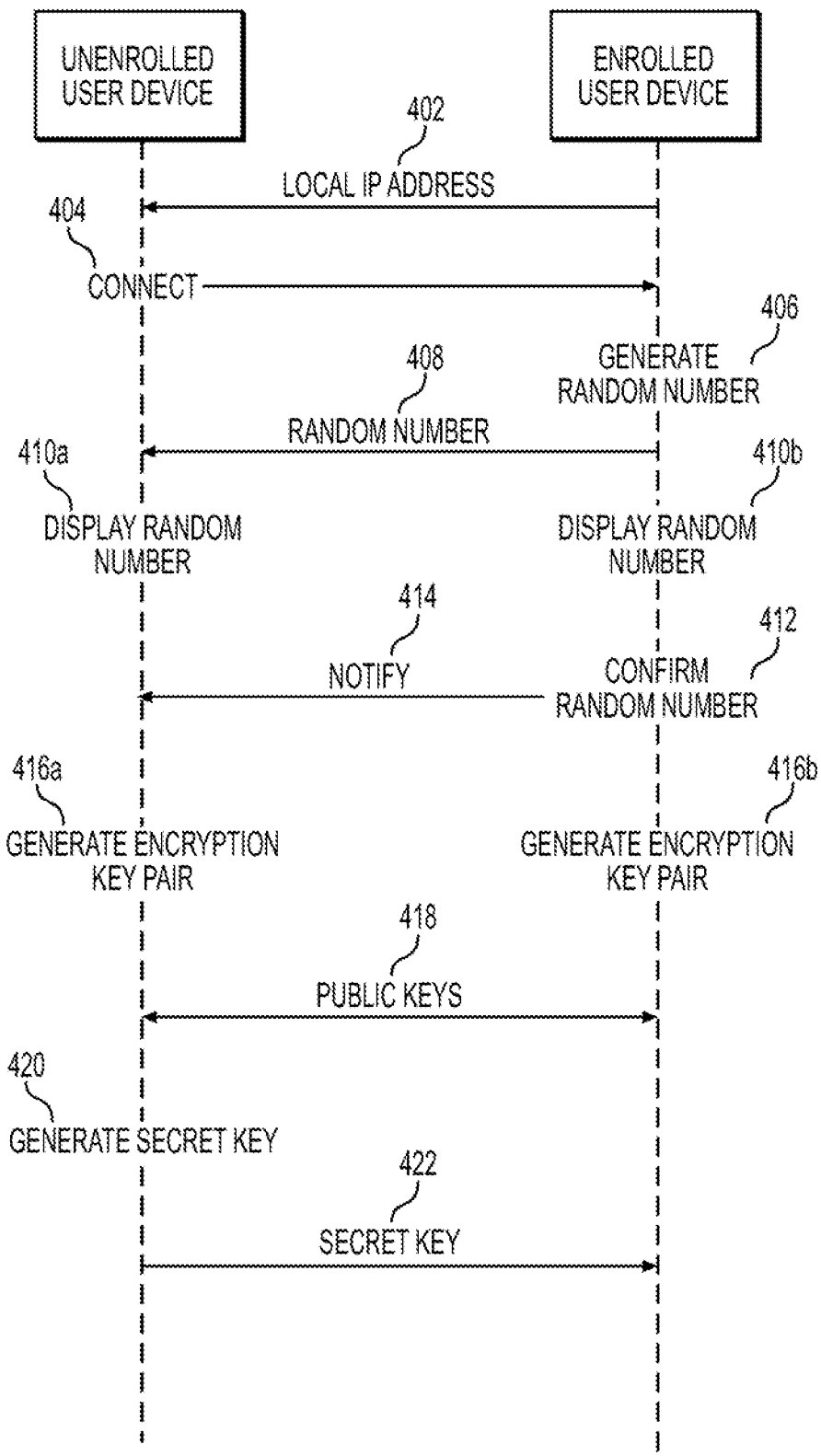
FIG. 4 is a sequence diagram of an example method for accessing system resources through an enrolled user device.
Figure 5:
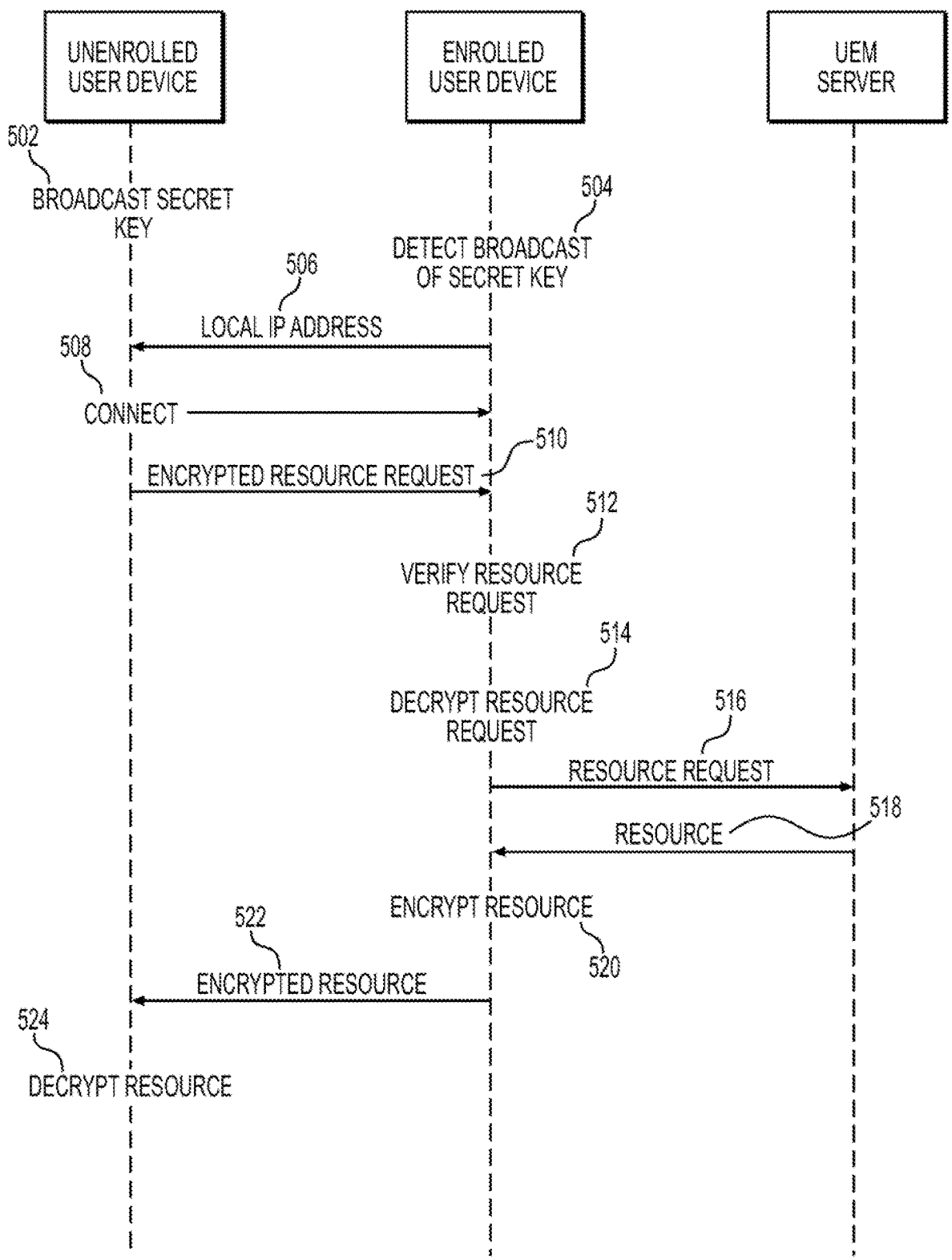
FIG. 5 is a sequence diagram of another example method for accessing system resources through an enrolled user device.
Figure 6:
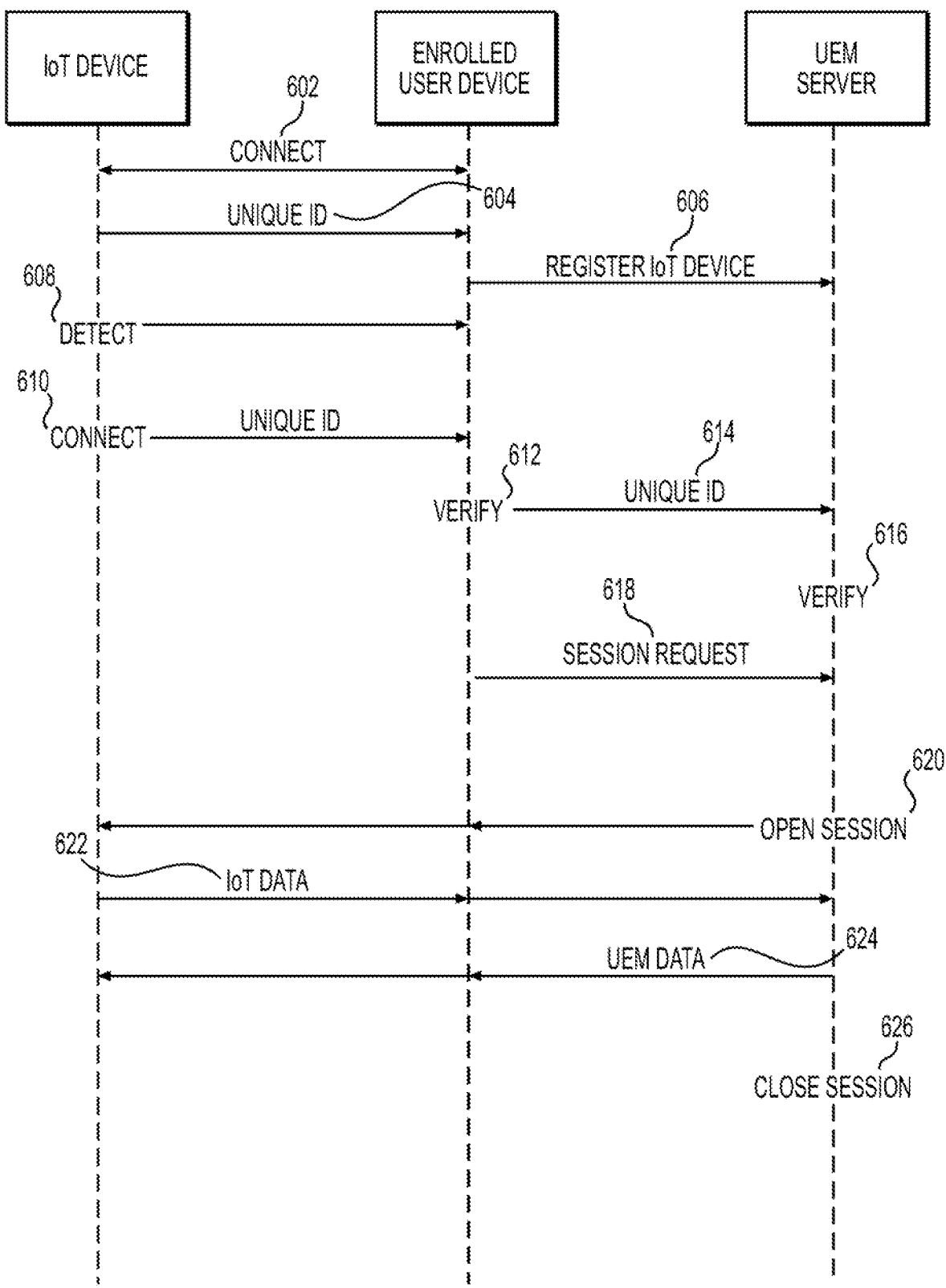
FIG. 6 is a sequence diagram of an example method for accessing system resources with an IoT device through an enrolled user device.
Figure 7:
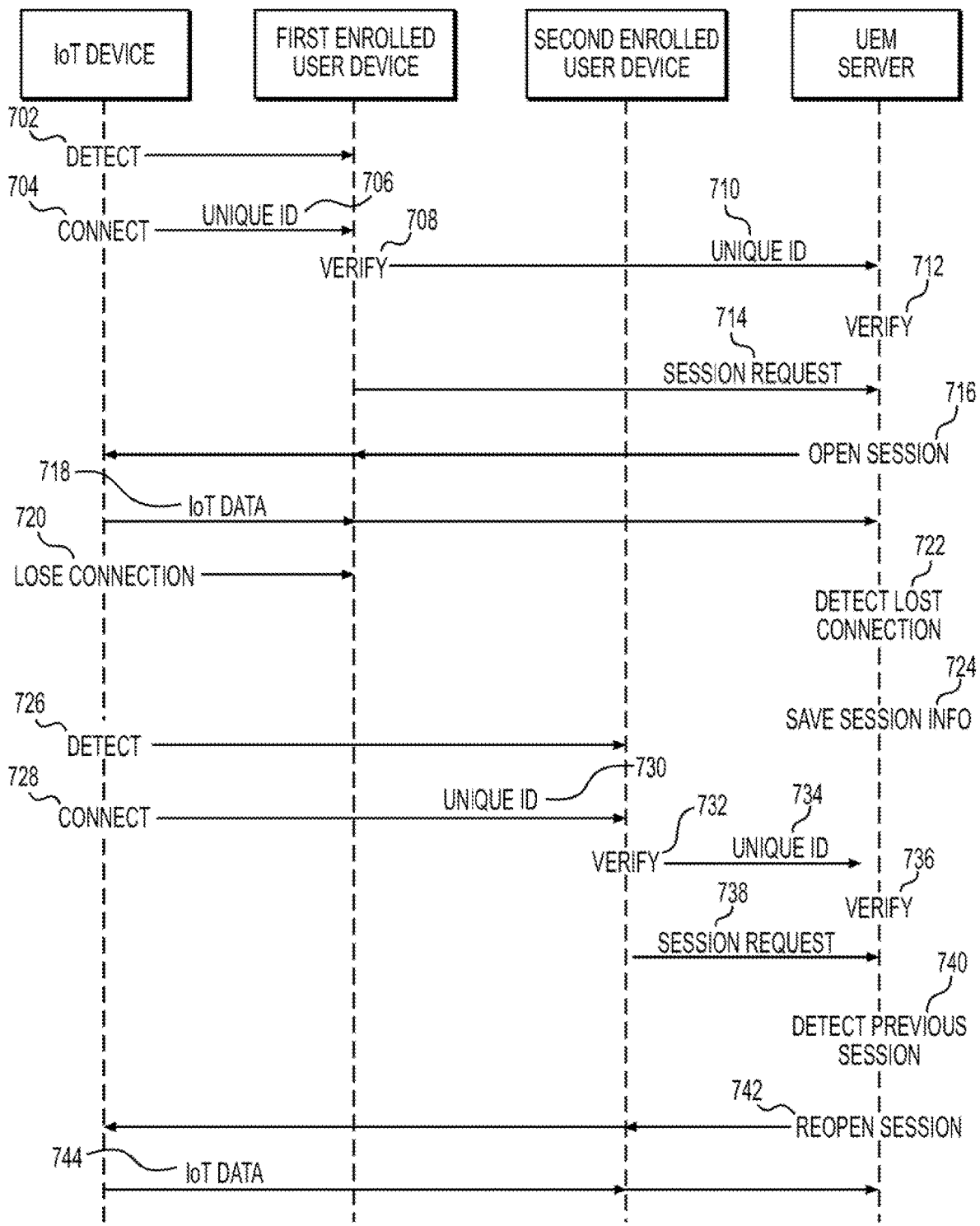
FIG. 7 is a sequence diagram of another example method for accessing system resources with an IoT device through an enrolled user device.

FIG. 1 is an illustration of an example system for performing accessing system resources through an enrolled user device. FIG. 2 is a flowchart of an example method for pairing an unenrolled device with an enrolled device so that the unenrolled device can access UEM resources through the enrolled device. FIG. 3 is a flowchart of an example method for accessing UEM resources from an unenrolled device through an enrolled device after the two devices are paired. FIG. 4 is a sequence diagram that illustrates the example method of device pairing described in FIG. 2. FIG. 5 is a sequence diagram that illustrates the example method of accessing UEM resources through an enrolled device described in FIG. 3. FIG. 6 is a sequence diagram of an example method for accessing system resources with an IoT device through an enrolled user device. FIG. 7 is a sequence diagram of an example method similar to FIG. 6 but includes stages where the IoT device loses connection with a first enrolled device and finishes a data transfer session with the UEM server with a second enrolled device.

FIG. 1 is an illustration of an example system for performing accessing system resources through an enrolled user device. The system can include a UEM system 110, enrolled user devices 120 (hereinafter referred to as "enrolled devices 120"), and unenrolled user devices 130 (hereinafter referred to as "unenrolled devices 130"). The UEM system 110 can be a system that manages and secures user devices that enroll with the UEM system 110. For example, the UEM system 110 can include a UEM server 112. The UEM server 112 can be a single server or a group of servers, including multiple servers implemented virtually across multiple computing platforms. In an example, the UEM server 112 can manage enrolled user devices 120 by sending management instructions to a management application 140 installed on the enrolled user devices 120. The enrolled user devices 120 can be one or more processor-based devices, such as a personal computer, tablet, or cell phone. The management application 140 can be a stand-alone application, part of an enterprise application, or part of an operating system of the enrolled devices 120.

In an example, the management application 140 can be responsible for ensuring that the enrolled devices 120 are up to date with compliance and security settings prior to accessing enterprise data and resources. The management application 140 can communicate with the UEM server 112, allowing UEM management of the enrolled devices 120 based on compliance and security settings at the UEM server 112. The management application 140 can enforce compliance at the enrolled devices 120, such as by wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources.

The enrolled user device 122 is one example of the enrolled user devices 120. The enrolled user device 122 can include the management application 140 and a UEM browser 150a. The UEM browser 150a can be a web browser application managed by the UEM system 110. In one example, the enrolled device 122 can include other managed applications as well.

In an example, the unenrolled devices 130 can include user devices that are not enrolled with the UEM system 110, like the unenrolled device 132. Although, the unenrolled device 132 is not enrolled, it can include the UEM browser 150b. The UEM browser 150b can be a secure web browser that allows the unenrolled device 132 to access UEM resources despite not being enrolled. For example, the UEM system 110 can allow the unenrolled device 132 to access certain UEM resources under certain conditions. As an example, the enrolled device 122 and the unenrolled device 132 can both belong to the same user. The user can log into the browser 150b on the unenrolled device 132 under the same user profile used to enroll the enrolled device 122. When the enrolled device 122 and unenrolled device 132 are connected to the same local network, or directly connected to each other, the UEM system 110 can allow the user to access UEM resources within the UEM browser 150b through the enrolled device 122. For example, the enrolled device 122 and unenrolled device 132 can establish a secure connection with other. The UEM browser 150b can send requests for UEM resources to the enrolled device 122, which can in turn send the requests to the UEM server 112. The UEM server 112 can send the UEM resources to the unenrolled device 132 through the enrolled device 122.

The unenrolled devices 130 can also include nonstandard computing devices, like the IoT device 134. The IoT device 134 can be one or more processor-based devices that can connect to a network and has data transfer capabilities. Examples of the IoT device 134 can include sensors, cameras, vehicles, appliances, security systems, thermostats, and more. Where the IoT device 134 is in a location where it cannot access a network, the IoT device 134 can be configured to access the UEM system 110 through enrolled devices 120. For example, the IoT device 134 can be configured to broadcast a signal that enrolled devices 120 are configured to detect. When an enrolled device 122 detects the broadcast, the IoT device 134 and the enrolled device 122 can establish a connection with each other. In an alternative example, the enrolled devices 120 can broadcast the signal that the IoT device 134 detects. After the connection is established, the enrolled device 122 can be configured to contact the UEM server 112 and request a data transfer session for the IoT device 134. The session can be a temporary and interactive information interchange whereby the IoT device 134 and UEM server 112 can exchange information through the enrolled device 122. The UEM server 112 can open a session, and the IoT device 134 and the UEM server 112 can then exchange data through the enrolled device 122. If the session gets interrupted, such as where the enrolled device 122 moves out of range from the IoT device 134, the UEM server 112 can save the session so that it can be continued when the IoT device 134 finds another enrolled device 122 to connect to.

FIG. 2 is a flowchart of an example method for pairing the enrolled device 122 and the unenrolled device 132 so that the unenrolled device 132 can access system resources through the enrolled device 122. At stage 210, the enrolled device 122 can provide a local network address of the enrolled device 122 to the unenrolled device 132. For example, the enrolled device 122 and unenrolled device 132 can both be connected to the same local network. The local network can include two or more devices connected to each other such that they can exchange electronic communications. For example, the local network can include a local area network ("LAN"), a wireless local area network ("WLAN"), a virtual private network ("VPN") internet connection, or two or more devices connected directly, such as through BLUETOOTH, WIFI DIRECT, or near-field communications ("NFC"). The network can include one or more nodes, such a routers or switches, that assign IP addresses to connect devices. The local network address of the enrolled device 122 can be its locally assigned IP address, in an example. If the enrolled device 122 permits, other devices on the local network can see and communicate with the enrolled device 122 using the local IP address of the enrolled device 122.

In one example, the enrolled device 122 can display the IP address on a display. For example, the management application 140 can have a feature that a user can select to initiate the pairing process with an unenrolled device. As part of the process, the management application 140 can retrieve the IP address from the network settings of the enrolled device 122 and display it on the display of the enrolled device 122. The user can then enter the IP address into the UEM browser 150b on the unenrolled device 132. In another example, the management application 140 can display a code, such as a bar code or Quick Response ("QR") code, that has the IP address embedded within. The user can scan the code with the unenrolled device 132, which can cause the UEM browser 150b to send a connection request to the local IP address.

At stage 220, the enrolled device 122 can receive a connection request from the unenrolled device 132. In one example, the request can come from the UEM browser 150b. The user can be required to use the UEM browser 150b, in an example. For example, the UEM browser 150b can be managed by the UEM system 110 and configured to prevent any other applications or services from accessing information within the UEM browser 150b, such as by encrypting any data related to the UEM system 110. In one example, the enrolled device 122 can verify that the connection request came from a UEM browser 150b before allowing the unenrolled device 132 to connect.

In one example, the UEM browser 150b can be configured to send the connection request to a specific port that the enrolled device 122 is configured to receive connection requests on. For example, the enrolled device 122 can listen for connection requests on the specified port, and any requests received on another port can be denied.

In an example, upon receiving the proper connection request, the enrolled device 122 can verify the request. For example, the UEM browser 150b can perform one or more security protocols, such as sending a certificate, encrypting the request or certificate with an encryption key that the enrolled device 122 can decrypt, or hashing the request or certificate with a has function that is known and trusted by the enrolled device 122. If the enrolled device 122 can verify unenrolled device 132, then the enrolled device 122 can establish the connection.

At stage 230, the enrolled device 122 can display a prompt with a randomly generated number. For example, to verify that the enrolled device 122 is connecting to the correct device, the enrolled device 122 can generate a random number and send it to the unenrolled device 132. The enrolled device 122 and unenrolled device 132 can then display the random number on their respective displays so that the user can verify that they match. In one example, the random number can be generated by the UEM browser 150b and sent to the enrolled device 122.

At stage 240, the enrolled device 122 can receive input indicating the random number displayed on the enrolled device 122 and the unenrolled device 132 match. For example, the enrolled device 122 can display the randomly generated number in a graphical user interface ("GUI") that includes buttons that allow the user to indicate whether the numbers match. In one example, the randomly generated number can be displayed on one of the two devices, and the user can be required to input the displayed number into the other device. For example, the enrolled device 122 can generate the random number and send it to the unenrolled device 132. In one example, the unenrolled device 132 can display the random number and the enrolled device 122 can prompt the user to enter the random number. Alternatively, the enrolled device 122 can display the number and the unenrolled device 132 can prompt the user to enter the number.

At stage 250, the enrolled device 122 can exchange public keys with the unenrolled device 132. In an example, the public keys can be part of an asymmetric encryption key pair. The private keys can be stored on the respective devices. The public key can be used to encrypt data with a one-way encryption algorithm so that the corresponding private key is the only key that can decrypt the data.

The keys can be generated in response to the connection request or already be stored on the devices 122 and 132. For example, the enrolled device 122 can generate its key pair after enrolling with the UEM system 110 and the UEM browser 150b on the unenrolled device 132 can generate its key pair when the UEM browser 150b is installed. The keys can later be used to authenticate the devices 122 and 132 and encrypt data exchanged between them.

At stage 260, the enrolled device 122 can receive a random key from the unenrolled device 132. For example, the UEM browser 150b can use a random number generator ("RNG") or a pseudorandom number generator ("PRNG") to generate a random number that corresponds to the random key. The random key can be used by the enrolled device 122 to identify and authenticate requests from the unenrolled device 132 for UEM resources. This is explained is greater detail below regarding FIG. 3.

FIG. 3 is another flowchart of an example method for the unenrolled device 132 accessing UEM system resources through the enrolled device 122. The example method described below can occur after the enrolled device 132 has already established trust with the unenrolled device 132. For example, the method illustrated in FIG. 3 can occur after the enrolled device 122 and unenrolled device 132 have paired using the method described in FIG. 2 above.

At stage 310, the enrolled device 122 detect the random key from the unenrolled device 132. The user can request UEM resources from the UEM browser 150*b* on the unenrolled device 132. The UEM browser 150*b* can then broadcast the random key. For example, the UEM browser can cause the unenrolled device 132 to send the broadcast over a local network that the unenrolled device 132 is connected to, such as a home, work, or public network.

At stage 320, the enrolled device 122 can respond to the broadcast by providing its local network address, such as its local IP address. In one example, the broadcast from the unenrolled device 132 can include the local network address of the unenrolled device 132, which the enrolled device 122 can use to send its own local network address.

In one example, the enrolled device 122 can identify the unenrolled device 132 based on the broadcast including the random key. For example, when the enrolled device 122 is connected to a network, the enrolled device 122 can be configured to listen for a broadcast the includes a random key of another device that the enrolled device 122 has previously paired with. The enrolled device 122 can identify the device associated with the broadcast based on the random key. For example, the enrolled device 122 can store a table that maps random keys with their associated unenrolled devices 130.

At stage 330, the enrolled device 122 can receive a request for a UEM resource from the unenrolled device 132. The requested UEM resource can include any data, application, or other resource managed by the UEM system 110. For example, UEM resources can include a document, image, video, a web application, or an internal web site. The unenrolled device 132 can send the request to the enrolled device 122 over the local network that both devices 122 and 132 are connected to. In one example, the UEM system 110 can require that both devices 122 and 132 are connected to the same local network for the enrolled device 122 to be permitted to send UEM resources to the 132. In another example, the UEM system 110 can allow the enrolled device 122 to send UEM resources to the unenrolled device 132 if the two devices 122 and 132 are directly connected, such as through BLUETOOTH, WIFI DIRECT, or NFC.

In one example, the enrolled device 122 can authenticate the unenrolled device 132. For example, the unenrolled device 132 can send the request with a certificate encrypted using the public key previously provided by the enrolled device 122. The enrolled device 122 can decrypt the certificate to authenticate the unenrolled device 132. In another example, the unenrolled device 132 can append the resource request with the random key.

In one example, the enrolled device 122 can determine how secure the local network is before processing the UEM resource request. For example, the enrolled device 122 can determine whether the local network is a preapproved network, determine whether the network is open or closed, determine what kind of security encryption the network uses, and identify any potentially malicious devices connected to the network. In on example, the UEM server 112 can provide instructions for determining the safety level of networks, and the enrolled device 122 can allow or reject the UEM resource request based on whether the local network meets the required security level.

At stage 340, the enrolled device 122 can send the resource request to the UEM server 112. The type of request sent can depend on the resource requested. For example, the enrolled device 122 can make an Application Programming Interface ("API") call to the UEM server 122 to access files like documents are videos. In one example, where resource request is for an internal web site or web application, the enrolled device 122 can make an API call that includes the uniform resource locator ("URL") of the web site or make a hypertext transfer protocol ("HTTP") request to the corresponding UEM web server.

At stage 350, the enrolled device 122 can receive the requested resource from the UEM server 112. For example, the UEM server 112 can retrieve the requested resource over the Internet. For example, the UEM server 112 can send a hypertext markup language ("HTML") file, Extensible Markup Language ("XML") file, or a JavaScript Object Notation ("JSON") file.

At stage 360, the enrolled device 122 can send the requested resource to the unenrolled device 132. For example, the unenrolled device 132 can send its own local IP address to the enrolled device 122 during one of the previous stages, which the enrolled device 122 can use to send the UEM resource. In one example, the enrolled device 122 can encrypt the UEM resource using the public key of the unenrolled device 132 before sending the UEM resource. The unenrolled device 132 can then decrypt the UEM resource using its private key.

In one example, the enrolled device 122 can continue to channel communications between the unenrolled device 132 and the UEM server 112. For example, where the UEM resource is a web application, the user can use the web application on the unenrolled device 132. As the user interacts with the web application, the unenrolled device 132 can send the user's inputs and any needed requests associated with the web application to the enrolled device 122, which can relay them to the UEM server 112. The UEM server 112 can send responses to the unenrolled device 132 through the enrolled device 122.

FIG. 4 is a sequence diagram of an example method for pairing the unenrolled device 132 and the enrolled device 122 for accessing system resources through the enrolled device 122. At stage 402, the enrolled device 122 can provide its local IP address to the unenrolled device 132. For example, the enrolled device 122 and unenrolled device 132 can both be connected to the same local network, such as a home and work network. The network can include one or more nodes, such a routers or switches, that assign IP addresses to connect devices. The local network address of the enrolled device 122 can be its locally assigned IP address, in an example. If the enrolled device 122 permits, other devices on the local network can see and communicate with the enrolled device 122 using the local IP address of the enrolled device 122.

In one example, the enrolled device 122 can display the IP address on a display, and the user can input the IP address into the unenrolled device 132. Alternatively, the management application 140 can display a code, such as a bar code or QR code, that has the IP address embedded within. The user can scan the code with the unenrolled device 132, which can cause the UEM browser 150*b* to send a connection request to the local IP address.

At stage 404, the unenrolled device 132 can connect to the enrolled device 122 using the local IP address. For example, the unenrolled device 132 can send a connection request through the local network using IP address of the enrolled device 122. One or more network nodes in the local network can route the request to the enrolled device.

In one example, the enrolled device 132 can verify the unrolled device 132 prior to accepting the request. For example, the user can log into the UEM browser 150b using credentials associated with the same user profile used to enroll the enrolled device 122. After logging in to the UEM browser 150b, the UEM server 112 can send a certificate to the UEM browser 150b that can be used to authenticate the enrolled device 132. The unenrolled device 132 can send the certificate with the connection request, which the enrolled device 122 can authenticate.

At stage 406, the enrolled device 122 can generate a random number. For example, to verify that the enrolled device 122 is connecting to the correct device, the enrolled device 122 can generate a random number and send it to the unenrolled device 132 at stage 408. The enrolled device 122 and unenrolled device 132 can then display the random number on their respective displays at stages 410a and 410b. If the numbers match, the user can confirm at stage 412. For example, the enrolled device 122 can prompt the user in a GUI to indicate whether the unenrolled device 132 is displaying the same number, such as by selecting a button. If the user confirms that the numbers match, at stage 414, the enrolled device 122 can notify the unenrolled device 132 of the confirmation, such as by sending a message.

At stages 416a and 416b, the enrolled device 122 (stage 416b) and the unenrolled device 132 (stage 416a) can each generate an encryption key pair. The encryption key pairs can include a private key and a corresponding public key. The public key can be used to encrypt data with a one-way encryption algorithm so that the corresponding private key is the only key that can decrypt the data. The keys can be generated in response to the connection request or already be stored on the devices 122 and 132. For example, the enrolled device 122 can generate its key pair after enrolling with the UEM system 110 and the UEM browser 150b on the unenrolled device 132 can generate its key pair when the UEM browser 150b is installed. The keys can later be used to authenticate the devices 122 and 132 and encrypt data exchanged between them. At stage 418, the enrolled device 122 and the unenrolled device 132 can exchange their public keys.

At stage 420, the unenrolled device 132 can generate a random key. For example, the UEM browser 150b can use an RNG or a PRNG to generate a random number. The random key can be used by the enrolled device 122 to identify and authenticate requests from the unenrolled device 132 for UEM resources. At stage 422, the unenrolled device 132 can send the random key to the enrolled device 122. The enrolled device 122 can use the random key to identify electronic transmissions sent from the unenrolled device 132.

FIG. 5 is a sequence diagram of an example method for accessing system resources by the unenrolled device 132 through the enrolled device 122. In an example, the method illustrated in FIG. 5 can occur after the enrolled device 122 and the unenrolled device 132 have paired using the method described above regarding FIG. 4. For example, the unenrolled device 132 can be in possession of the public key from the enrolled device 122, and the enrolled device 122 can be in possession of the public key and the random key from the unenrolled device 132.

At stage 502, the unenrolled device 132 can broadcast the random key. For example, the unenrolled device 132 can broadcast the random key on a local network that it is connected to or using a localized wireless communication method like BLUETOOTH LOW ENERGY ("BLE"). In an example, the unenrolled device 132 can broadcast the random key in response to user input. For example, when the user opens the UEM browser 150b or inputs a URL into the UEM browser 150b, the UEM browser 150b can cause the unenrolled device 132 to broadcast the random key to see if there is an enrolled device 122 available to operate through.

At stage 504, the enrolled device 122 can detect the broadcasted random key. For example, the management application 140 on the enrolled user device 122 can be configured to listen for the random key on the local network. The enrolled device 122 can detect the broadcast and, based on the random key, determine that the broadcast came from the unenrolled device 132 that it previously paired with.

At stage 506, the enrolled device 122 can send its local IP address to the unenrolled device 132. For example, the enrolled device 122 can be assigned a local IP address from a local network node like a switch or a router. At stage 508, the unenrolled device 132 can connect to the enrolled device 122 using the local IP address. In examples where the enrolled device 122 and the unenrolled device 132 connect directly, such as through BLUETOOTH, NFC, or WIFI DIRECT, the two devices 122, 132 can connect without the local IP address.

At stage 510, the unenrolled device 132 can send an encrypted request for UEM resources to the unenrolled device 132. In an example, the request can be encrypted using the public key of the enrolled device 122. For example, the user can enter a URL for a UEM web application into the UEM browser 150b. The UEM browser 150b can encrypt the URL using the public key of the enrolled device 122 and send the encrypted request to the enrolled device 122.

At stage 512, the enrolled device 122 can verify the resource request. For example, the unenrolled device 132 can include the random key with the resource request, and the enrolled device 122 can verify that the request came from the unenrolled device 132 based on the random key. In one example, the enrolled device 122 can send an encrypted security certificate to the unenrolled device 132 when the pair, and the unenrolled device 132 can include the certificate with the request.

At stage 514, the enrolled device 122 can decrypt the resource request. For example, the public key used by the unenrolled device 132 to encrypt the request can correspond to the private key at the enrolled device 122, and the enrolled device 122 can decrypt the request using the private key. Decrypting the request can reveal which resource the unenrolled device 132 is requesting so that the enrolled device 122 knows where to send the request.

At stage 516, the enrolled device 122 can send the resource request to the UEM server 112. The UEM server 112 that receives the request can depend on the request. In an example where the request includes a URL for a UEM web application, and the UEM server 112 can be a web server that hosts the web application. The UEM web application can send an HTTP request to the UEM server 112 using the provided URL. In one example, the request can identify a UEM resource, and the enrolled device 122 can send an identifier of the UEM resource to the UEM server 112. In one example, this can be done using an API call to the UEM server 112. The UEM server 112 can then identify another server or device within the UEM system 110 that provides the request UEM resource. In one example, the enrolled device 122 can send the resource request to the UEM server 112 using a secure channel, such as through an established VPN connection open with the UEM server 112.

At stage 518, the UEM server 112 can send the requested resource to the enrolled device 122. In one example, the UEM server 112 can send a data file corresponding to the UEM resource. As an example, the UEM server 112 can send an HTML, XML, or JSON file corresponding to or including the UEM resource. The UEM server 112 can send the UEM resource using an HTTP request, API call, or other network transmission protocol. In one example, the UEM server 112 can send the UEM resource through a secure VPN connection with the enrolled device 122.

At stage 520, the enrolled device 122 can encrypt the UEM resource. For example, the enrolled device 122 can encrypt the UEM resource using the public key received from the unenrolled device 132 during the pairing process. This public key can correspond to a private key securely stored at the unenrolled device 132.

At stage 522, the enrolled device 122 can send the encrypted resource to the unenrolled device 132. For example, when the unenrolled device 132 connects to the enrolled device 122 at stage 508, the unenrolled device 132 can provide its local IP address to the enrolled device 122. The enrolled device 122 can then send the encrypted UEM resource to the unenrolled device 132 using that local IP address. In some examples, the enrolled device 122 can send the encrypted UEM resource using other network transmission methods, such as BLE, WIFI DIRECT, or NFC.

At stage 524, the unenrolled device 132 can decrypt the UEM resource. For example, the unenrolled device 132 can decrypt the UEM resource with the private key generated during the pairing process. The UEM browser 150b can then display the resource on the unenrolled device 132 for the user. In an example, the user can continue to access UEM resources at the unenrolled device 132 using the method described above. For example, where the UEM resource is a web application, the user can use the web application within the UEM browser 150b. When a user interaction with the web application requires additional resources, the unenrolled device 132 can request and receive the additional resources as needed using the method described above.

In an example, the user can freely access UEM resources, such as freely using a UEM web application, on the unenrolled device 132 so long as certain conditions are met. For example, the unenrolled device 132 can continue to request and receive UEM resources so long as both devices 122, 132 are connected to the same local network, the local network continues to meet security requirements, and the devices 122, 132 continue to meet security requirements. For example, the management application 140 can continuously monitor the local network and devices 122, 132, and if any of them fail UEM security requirements, the management application 140 can restrict the unenrolled device's 132 access to the UEM system 110. In one example where a security flaw is detected, the management application 140 can instruct the UEM browser 150b to wipe any UEM resources previously sent to the unenrolled device 132.

FIG. 6 is a sequence diagram of an example method for accessing UEM system resources with the IoT device 134 through the enrolled device 122. At stage 602, the IoT device 134 and the enrolled device 122 can establish a connection with each other. For example, a user can connect the enrolled device 122 to the IoT device 134 using a direct connection method, such as BLE, WIFI DIRECT, or ZIGBEE. As an example, the user can put the IoT device 134 into a pairing mode based on specifications of the IoT device 134, and the user can instruct the enrolled device 122 to search for new devices from within the management application 140. The management application 140 can detect the IoT device 134 and establish a connection.

At stage 604, the IoT device 134 can send a unique ID to the enrolled device 122. In an example, the unique ID can be a hardware ID, such as a vendor-defined string of alphanumeric characters that identifies the IoT device 134, such as a serial and model number, an International Mobile Equipment Identity ("IMEI") number, or a vendor-specific ID type.

At stage 606, the enrolled device 122 can register the IoT device 134 with the UEM server 112. For example, the enrolled device 122 can send a registration request for the IoT device 134 to the UEM server 112 that includes the unique ID. The UEM server 112 can store the unique ID so that the IoT device 134 can be identified and verified later for data transmissions. In one example, the enrolled device 122 can install a certificate or encryption key at the IoT device 134 that can be used for verification. For example, the enrolled device 122 can install a Transport Layer Security ("TLS") certificate, a symmetric key, or an asymmetric key. The certificate or encryption key can be provided by the UEM server 112, in an example.

At stage 608, the IoT device 134 can detect the enrolled device 122. For example, the IoT device 134 can scan for nearby enrolled devices 122. The IoT device 134 can perform the scan continuously, periodically, on a schedule, on demand, or some combination of these. For example, the IoT device 134 can be configured to scan for enrolled devices 120 during times when enrolled devices 120 are most likely to be nearby, such as during business hours. In another example, the IoT device 134 can scan for enrolled devices 120 when it has a payload to send to the UEM server 112.

In an example, the enrolled devices 120 can be configured to send a broadcast that IoT devices 134 can detect. In one example, the enrolled devices 120 can send the broadcast using a low-energy method like BLE. When the enrolled device 122 is close enough that the IoT device 134 can detect the broadcast, the IoT device 134 can detect the broadcast. In some examples, the IoT device 134 can send the broadcast and the enrolled device 122 can be configured to listen for such broadcasts.

At stage 610, the IoT device 134 can connect to the enrolled device 122 and send the unique ID. In one example, the IoT device 134 can send a connection request in response to detecting the enrolled device 122. The IoT device 134 can send its unique ID so that the enrolled device 122 can verify the IoT device 134 at stage 612. For example, the enrolled device 122 can send the unique ID to the UEM server 112 at stage 614, and at stage 616 the UEM server 112 can check the unique ID against known unique IDs of IoT devices 134 to verify the IoT device 134. In one example, the IoT device 134 can also send a certificate to the enrolled device 122, which the enrolled device 122 can send to the UEM server 112. The UEM server 112 can authenticate the IoT device 134 using the certificate, including ensuring that the certificate matches the proper unique ID of the IoT device 134.

At stage 618, the enrolled device 122 can send a session request to the UEM server 112. The session request can be on behalf of the IoT device 134. For example, the IoT device 134 may not have network capabilities that allow it to connect to the UEM server 112. The requested session can be a temporary and interactive information interchange whereby the IoT device 134 and UEM server 112 can exchange information through the enrolled device 122.

At stage 620, the UEM server 112 can open the request data transfer session. The UEM server 112 can notify the enrolled device 122, which can in turn notify the IoT device 134.

At stage 622, the IoT device 134 can send IoT data to the UEM server 112 through the enrolled device 122. For example, the IoT device 134 can send data to the enrolled device 122, and the enrolled device 122 in turn can send the data to the UEM server 112. The IoT data that the IoT device 134 sends can be based on instructions from the UEM server 112. For example, when the IoT device 134 is registered at stage 606, the UEM server 112 can send instructions to the IoT device 134 through the enrolled device 122 that indicate what data to collect and send. For example, the UEM server 112 can instruct the IoT device 134 to send event logs, telemetry data, and other data. Alternatively or additionally, the UEM server 112 can request certain information after the session is opened with the IoT device 134.

At stage 624, the UEM server 112 can send UEM data to the IoT device 134 through the enrolled device 122. UEM data can include data collection instructions, firmware updates, security updates, and updated security certificates, as some examples. For example, where the UEM server 112 has a firmware update for a type of IoT device 134, the UEM server 112 can wait for the IoT device 134 to open a session through an enrolled device 122. Once the session is opened, the UEM server 112 can send the firmware update file to the enrolled device 122, and the enrolled device 122 can transfer the firmware update file to the IoT device 134.

At stage 626, the UEM server 112 can close the session. For example, the IoT device 134 and the UEM server 112 can each confirm that the data transfer is complete. In response, the UEM server 112 can close the session. In an example, closing the session can include sending instructions to the enrolled device 122 to terminate its connection with the IoT device 134.

FIG. 7 is a sequence diagram of another example method for accessing system resources with the IoT device 134 through enrolled devices 122. In this example method, the IoT device 134 can already be registered with the UEM system 110. For example, as described in stages 602, 604, and 606 of FIG. 6 above, the IoT device 134 can have already connected to an enrolled device 122 and provided a unique ID to the enrolled device 122. The enrolled device 122 can have registered the IoT device 134 with the UEM server 112, provided the unique ID to the UEM server 112, and provided any security certificates to the IoT device 134.

At stage 702, the IoT device 134 can detect a first enrolled device 122. The first enrolled device 122 can be any device that is enrolled with the UEM system 110 and has permissions to facilitate data transfer sessions with IoT devices 134. In one example, the IoT device 134 scan for nearby enrolled devices 122. The first enrolled device 122 can be configured to send a broadcast that IoT devices 134 can detect, such as a BLE broadcast. When the first enrolled device 122 is close enough to the IoT device 134, the IoT device 134 can detect the broadcast. In an alternative example, the IoT device 134 can send the broadcast and the first enrolled device 122 can be configured to listen for such broadcasts. This can be more efficient in examples where the IoT device 134 has a continuous power source and battery life is not a concern for the IoT device 134.

At stage 704, the IoT device 134 can connect to the first enrolled device 122. In one example, the IoT device 134 can send a connection request in response to detecting the first enrolled device 122. After connecting, at stage 706, the IoT device 134 can send its unique ID to the first enrolled device 122. In one example, the IoT device 134 can also send any security certificate that it received during registration.

At stage 708, the first enrolled device 122 can verify the IoT device 134. For example, the enrolled device 122 can send the unique ID and any certificates to the UEM server 112 at stage 710. Then, at stage 712, the UEM server 112 can check the unique ID against known unique IDs of registered IoT devices 134 to verify the IoT device 134. The UEM server 112 can also verify any certificates received from the IoT device 134.

At stage 714, the first enrolled device 122 can send a session request to the UEM server 112. The session request can be on behalf of the IoT device 134. For example, the IoT device 134 may not have network capabilities that allow it to connect to the UEM server 112. The requested session can be a temporary and interactive information interchange whereby the IoT device 134 and UEM server 112 can exchange information through the first enrolled device 122.

At stage 716, the UEM server 112 can open a data transfer session with the IoT device 134 through the first enrolled device 122. The UEM server 112 can notify the enrolled device 122, which can in turn notify the IoT device 134.

At stage 718, the IoT device 134 can send IoT data to the UEM server 112 through the first enrolled device 122. For example, the IoT device 134 can send data to the first enrolled device 122, and the first enrolled device 122 in turn can send the data to the UEM server 112. The IoT data that the IoT device 134 sends can be based on instructions from the UEM server 112. For example, during registration, the UEM server 112 can send instructions to the IoT device 134 through the registering enrolled device 122 that indicate what data to collect and send. For example, the UEM server 112 can instruct the IoT device 134 to send event logs, telemetry data, and other data. Alternatively or additionally, the UEM server 112 can request certain information after the session is opened with the IoT device 134.

In an example, stage 718 can include the UEM server 112 sending UEM data to the IoT device 134. UEM data can include data collection instructions, firmware updates, security updates, and updated security certificates, as some examples. For example, where the UEM server 112 has a firmware update for a type of IoT device 134, the UEM server 112 can wait for the IoT device 134 to open a session through an enrolled device 122. Once the session is opened, the UEM server 112 can send the firmware update file to the enrolled device 122, and the enrolled device 122 can transfer the firmware update file to the IoT device 134.

At stage 720, the IoT device 134 can lose connection with the first enrolled device 122. For example, the first enrolled device 122 can be moved away from the IoT device 134 and out of data transfer range or the first enrolled device 122 can be powered down. As an example, the first enrolled device 122 can belong to a user that walks near the IoT device 134 while in possession of the first enrolled device 122. The IoT device 134 can connect to the first enrolled device 122 and begin exchanging data with the UEM server 112. Before the session ends (i.e., before the IoT device 134 and the UEM server 112 are done sending data), the user can walk out of transmission range with the first enrolled device 122.

At stage 722, the UEM server 112 can detect the lost connection. In one example, the UEM server 112 can lose connection with the first enrolled device 122. Alternatively, the first enrolled device 122 can notify the UEM server 112 that it lost connection with the IoT device 134.

At stage 724, the UEM server 112 can save the session information. For example, the UEM server 112 can create a log that indicates what data it successfully received from and sent to the IoT device 134. In one example, the first enrolled device 122 can inform the UEM server 112 what data it successfully sent to the IoT device 134 before the disconnection occurred. The UEM server 112 can use the saved session information to continue the data transfer the next time the IoT device 134 is able to reconnect to the UEM server 112.

For example, at stage 726, the IoT device 134 can detect a second enrolled device 122. The second enrolled device 122 can be the same or different from the first enrolled device 122, depending on the example. Similar to stage 702, the IoT device 134 or the second enrolled device 122, depending on the example, can send a broadcast that can be detected by other enrolled or registered devices.

At stage 728, the IoT device 134 can connect to the second enrolled device 122. In one example, the IoT device 134 can send a connection request in response to detecting the second enrolled device 122, or vice versa. After connecting, at stage 730, the IoT device 134 can send its unique ID to the second enrolled device 122. In one example, the IoT device 134 can also send any security certificate that it received during registration.

At stage 732, the second enrolled device 122 can verify the IoT device 134. For example, the enrolled device 122 can send the unique ID and any certificates to the UEM server 112 at stage 734. Then, at stage 736, the UEM server 112 can check the unique ID against known unique IDs of registered IoT devices 134 to verify the IoT device 134. The UEM server 112 can also verify any certificates received from the IoT device 134. At stage 738, the second enrolled device 122 can send a session request to the UEM server 112. Like in stage 714, the session request can be on behalf of the IoT device 134.

At stage 740, the UEM server 112 can detect the previously saved session. For example, the UEM server 112 can check the unique ID of the IoT device 134 against saved logs of previous incomplete sessions. In doing so, the UEM server 112 can detect the session saved at stage 724. Then, at stage 742, the UEM server 112 can reopen the previous session with the IoT device 134, except this session can be opened through the second enrolled device 122.

At stage 744, the IoT device 134 can finish sending IoT data to the UEM server 112 through the second enrolled device 122. In one example, stage 744 can include the UEM server 112 sending any unsent UEM data to the IoT device 134.

In some examples, the IoT device 134 can lose connection again before finishing the data transfer. In such examples, the method can return to stage 720 and proceed through the remaining stages again, except the IoT device 134 can connect to a third enrolled device 122 to establish the session. This cycle can be repeated until the all the necessary data is exchanged between the IoT device 134 and the UEM server 112.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method of managing data transfer between a Unified Endpoint Management (UEM) server for a device management system and an Internet of Things ("IoT") device through a group of enrolled user devices, wherein each of the enrolled user devices includes i) a management application executing therein through which data is communicated with the UEM server and with which compliance of the enrolled user device with security setting at the UEM server is enforced; and ii) a UEM browser managed by the UEM server, and the IoT device does not have network capabilities to connect to the UEM server, comprising:
   a process of registering the IoT device with the UEM server that includes:
      sending, from the IoT device to a first enrolled user device in the group that is wirelessly connected to the IoT device in a local network, a unique identifier ("ID") of the IoT device, and in response thereto, receiving, at the IoT device from the first enrolled user device, a security certificate provided by the UEM server and used by the UEM server in authentication of the IoT device; and
      installing the security certificate in the IoT device; and
   a process of transferring data from the IoT device to the UEM server that includes:
      in an instance where the IoT device loses connection with the first enrolled user device and a data transfer session between the UEM server and the IoT device, via the first enrolled user device, is disconnected, detecting, at the IoT device, a second enrolled user device in the group by scanning nearby enrolled devices, and establishing a wireless connection with the second enrolled user device in the local network, the data transfer session being saved by the UEM server;
      sending, from the IoT device to the second enrolled user device, the security certificate installed in the IoT device and the unique ID of the IoT device, and in response thereto, receiving, at the IoT device, a notification from the second enrolled user device that the UEM server has reopened the data transfer session between the UEM server and the IoT device, via the second enrolled user device, after detection of a saved data transfer session associated with the unique ID by the UEM server; and
      sending, from the IoT device to the second enrolled user device, data to be transmitted to the UEM server by the second enrolled user device using the opened data transfer session.

2. The method of claim 1, further comprising:
   receiving, at the IoT device and through the second enrolled user device, data from the UEM server.

3. The method of claim 1, wherein the IoT device detects the second enrolled user device using a localized wireless communication method.

4. The method of claim 1, wherein the process of registering the IoT device with the management system further includes:
   sending, from the IoT device to the first enrolled user device, data to be transmitted to the UEM server by the first enrolled user device in response to instructions provided by the UEM server.

5. The method of claim 1, wherein, in an instance where the IoT device loses connection with the second enrolled user device before sending a portion of the data to be transmitted to the UEM server, the method further comprises:

detecting, at the IoT device, a third enrolled user device in the group by scanning nearby enrolled devices, and establishing a wireless connection with the third enrolled user device in the local network;

sending, from the IoT device to the third user device, the security certificate installed in the IoT device and the unique ID of the IoT device, and in response thereto, receiving, at the IoT device, a notification from the third enrolled user device that the UEM server has reopened a data transfer session between the UEM server and the IoT device via the third enrolled user device; and;

sending, from the IoT device to the third enrolled user device, the unsent portion of the data-to be transmitted to the UEM server by the third enrolled user device using the reopened data transfer session.

6. The method of claim 1, wherein the unique ID is a vendor-defined string of alphanumeric characters unique to the IoT device.

7. The method of claim 1, wherein the security certificate and the unique ID of the IoT device sent from the IoT device to the second enrolled user device cause the second enrolled user device to send the security certificate and the unique ID to the UEM server and thereafter a session request to the UEM server.

8. A non-transitory, computer-readable medium containing instructions that, when executed by a hardware-based processor, cause the processor to perform a method of managing data transfer between a Unified Endpoint Management (UEM) server for a device management system and an Internet of Things ("IoT") device through a group of enrolled user devices, wherein each of the enrolled user devices includes i) a management application executing therein through which data is communicated with the UEM server and with which compliance of the enrolled user device with security setting at the UEM server is enforced; and ii) a UEM browser managed by the UEM server, and the IoT device does not have network capabilities to connect to the UEM server, said method comprising:

a process of registering the IoT device with the UEM server that includes:

sending, from the IoT device to a first enrolled user device in the group that is wirelessly connected to the IoT device in a local network, a unique identifier ("ID") of the IoT device, and in response thereto, receiving, at the IoT device from the first enrolled user device, a security certificate provided by the UEM server and used by the UEM server in authentication of the IoT device; and installing the security certificate in the IoT device; and a process of transferring data from the IoT device to the UEM server that includes:

in an instance where the IoT device loses connection with the first enrolled user device and a data transfer session between the UEM server and the IoT device, via the first enrolled user device, is disconnected, detecting, at the IoT device, a second enrolled user device in the group by scanning nearby enrolled devices, and establishing a wireless connection with the second enrolled user device in the local network, the data transfer session being saved by the UEM server;

sending, from the IoT device to the second enrolled user device, the security certificate installed in the IoT device and the unique ID of the IoT device, and in response thereto, receiving, at the IoT device, a notification from the second enrolled user device that the UEM server has reopened the data transfer session between the UEM server and the IoT device, via the second enrolled user device, after detection of a saved data transfer session associated with the unique ID by the UEM server; and sending, from the IoT device to the second enrolled user device, data to be transmitted to the UEM server by the second enrolled user device using the opened data transfer session.

9. The non-transitory, computer-readable medium of claim 8, the method further comprising:

receiving, at the IoT device and through the second enrolled user device, data from the UEM server.

10. The non-transitory, computer-readable medium of claim 8, wherein the IoT device detects the second enrolled user device using a localized wireless communication method.

11. The non-transitory, computer-readable medium of claim 8, wherein the process of registering the IoT device with the management system further includes:

sending, from the IoT device to the first enrolled user device, data to be transmitted to the UEM server by the first enrolled user device in response to instructions provided by the UEM server.

12. The non-transitory, computer-readable medium of claim 8, wherein, in an instance where the IoT device loses connection with the second enrolled user device before sending a portion of the data to be transmitted to the UEM server, the method further comprises:

detecting, at the IoT device, a third enrolled user device in the group by scanning nearby enrolled devices, and establishing a wireless connection with the third enrolled user device in the local network;

sending, from the IoT device to the third user device, the security certificate installed in the IoT device and the unique ID of the IoT device, and in response thereto, receiving, at the IoT device, a notification from the third enrolled user device that the UEM server has reopened a data transfer session between the UEM server and the IoT device via the third enrolled user device; and;

sending, from the IoT device to the third enrolled user device, the unsent portion of the data-to be transmitted to the UEM server by the third enrolled user device using the reopened data transfer session.

13. The non-transitory, computer-readable medium of claim 8, wherein the unique ID is a vendor-defined string of alphanumeric characters unique to the IoT device.

14. The non-transitory, computer-readable medium of claim 8, wherein the security certificate and the unique ID of the IoT device sent from the IoT device to the second enrolled user device cause the second enrolled user device to send the security certificate and the unique ID to the UEM server and thereafter a session request to the UEM server.

15. A system for managing data transfer between a Unified Endpoint Management (UEM) server for a device management system and an Internet of Things ("IoT") device through a group of enrolled user devices, wherein each of the enrolled user devices includes i) a management application executing therein through which data is communicated with the UEM server and with which compliance of the enrolled user device with security setting at the UEM server is enforced; and ii) a UEM browser managed by the UEM server, and the IoT device does not have network capabilities to connect to the UEM server, the IoT device comprising:
- a memory storage including a non-transitory, computer-readable medium comprising instructions; and
- a hardware-based processor that executes the instructions to carry out a method comprising:
  - a process of registering the IoT device with the UEM server that includes:
    - sending, from the IoT device to a first enrolled user device in the group that is wirelessly connected to the IoT device in a local network, a unique identifier ("ID") of the IoT device, and in response thereto, receiving, at the IoT device from the first enrolled user device, a security certificate provided by the UEM server and used by the UEM server in authentication of the IoT device; and
    - installing the security certificate in the IoT device; and
  - a process of transferring data from the IoT device to the UEM server that includes:
    - in an instance where the IoT device loses connection with the first enrolled user device and a data transfer session between the UEM server and the IoT device, via the first enrolled user device, is disconnected, detecting, at the IoT device, a second enrolled user device in the group by scanning nearby enrolled devices, and establishing a wireless connection with the second enrolled user device in the local network, the data transfer session being saved by the UEM server;
    - sending, from the IoT device to the second enrolled user device, the security certificate installed in the IoT device and the unique ID of the IoT device, and in response thereto, receiving, at the IoT device, a notification from the second enrolled user device that the UEM server has reopened the data transfer session between the UEM server and the IoT device via the second enrolled user device, after detection of a saved data transfer session associated with the unique ID by the UEM server; and
    - sending, from the IoT device to the second enrolled user device, data to be transmitted to the UEM server by the second enrolled user device using the opened data transfer session.

16. The system of claim 15, the method further comprising:
   receiving, at the IoT device and through the second enrolled user device, data from the UEM server.

17. The system of claim 15, wherein the IoT device detects the second enrolled user device using a localized wireless communication method.

18. The system of claim 15, wherein the process of registering the IoT device with the management system further includes:
   sending, from the IoT device to the first enrolled user device, data to be transmitted to the UEM server by the first enrolled user device in response to instructions provided by the UEM server.

19. The system of claim 15, wherein, in an instance where the IoT device loses connection with the second enrolled user device before sending a portion of the data to be transmitted to the UEM server, the method further comprises:
   detecting, at the IoT device, a third enrolled user device in the group by scanning nearby enrolled devices, and establishing a wireless connection with the third enrolled user device in the local network;
   sending, from the IoT device to the third user device, the security certificate installed in the IoT device and the unique ID of the IoT device, and in response thereto, receiving, at the IoT device, a notification from the third enrolled user device that the UEM server has reopened a data transfer session between the UEM server and the IoT device via the third enrolled user device; and;
   sending, from the IoT device to the third enrolled user device, the unsent portion of the data-to be transmitted to the UEM server by the third enrolled user device using the reopened data transfer session.

20. The system of claim 15, wherein the security certificate and the unique ID of the IoT device sent from the IoT device to the second enrolled user device cause the second enrolled user device to send the security certificate and the unique ID to the UEM server and thereafter a session request to the UEM server.

* * * * *